US009407356B2

(12) United States Patent
De Las Heras Iglesias et al.

(10) Patent No.: US 9,407,356 B2
(45) Date of Patent: Aug. 2, 2016

(54) DIGITAL AUDIO SYSTEM OF AN AIRCRAFT

(71) Applicant: EADS Construcciones Aeronauticas S.A., Madrid (ES)

(72) Inventors: Marcos De Las Heras Iglesias, Getafe (ES); Francisco Javier Camacho Almendros, Getafe (ES); Daniel Saldana Sage, Getafe (ES); Pedro Luis Malaga Cobollo, Getafe (ES); Eladio Fernandez Roman, Ciudad Real (ES); Jose Luis Mendoza Rodriguez-Borlado, Ciudad Real (ES)

(73) Assignee: EADS Construcciones Aeronauticas S.A., Madrid (ES)

( * ) Notice: Subject to any disclaimer, the term of this patent is extended or adjusted under 35 U.S.C. 154(b) by 0 days.

(21) Appl. No.: 14/437,557

(22) PCT Filed: Oct. 17, 2013

(86) PCT No.: PCT/ES2013/070715
§ 371 (c)(1),
(2) Date: Apr. 22, 2015

(87) PCT Pub. No.: WO2014/064312
PCT Pub. Date: May 1, 2014

(65) Prior Publication Data
US 2015/0270892 A1 Sep. 24, 2015

(30) Foreign Application Priority Data

Oct. 22, 2012 (EP) .................................... 12382410

(51) Int. Cl.
*H04B 1/38* (2015.01)
*H04B 7/24* (2006.01)
*H04M 1/58* (2006.01)
*H04R 1/08* (2006.01)
*H04R 1/10* (2006.01)

(52) U.S. Cl.
CPC . *H04B 7/24* (2013.01); *H04M 1/58* (2013.01); *H04R 1/08* (2013.01); *H04R 1/1008* (2013.01)

(58) Field of Classification Search
CPC .............. H04M 9/082; H04M 1/7253; H04M 2250/02; H04M 3/002; H04M 1/0258; H04M 1/6058; H04M 1/72513; H04W 4/10; H04W 76/005; H04W 84/105
USPC ........................... 455/575.2, 570, 569.2, 41.2
See application file for complete search history.

(56) References Cited

U.S. PATENT DOCUMENTS 5,396,651 A 3/1995 Nitardy
2010/0087218 A1* 4/2010 Hannosh ............... H04M 9/082
455/518

FOREIGN PATENT DOCUMENTS

KR 20090121416 11/2009

OTHER PUBLICATIONS

International Search Report, Jan. 16, 2014.

*Primary Examiner* — Tu X Nguyen
(74) *Attorney, Agent, or Firm* — Greer, Burns & Crain Ltd.

(57) ABSTRACT

A digital audio system of an aircraft comprising one or more pieces of audio equipment and one or more pieces of radio equipment providing a reliable side tone to the operators. The audio equipment and the radio equipment have installed in the proximity, respectively, an audio-terminal and a radio-terminal connected to a digital network including digital messages management units and digital signal processors. The digital messages management unit of the audio equipment is provided with a computer program adapted to generate a side tone of an analog audio message issued by the microphone of the audio equipment and to activate/deactivate its sending to the headset of the audio equipment when the audio-terminal receives from the radio-terminal an activation/deactivation command for said side tone.

12 Claims, 2 Drawing Sheets

DIGITAL AUDIO SYSTEM OF AN AIRCRAFT

CROSS-REFERENCES TO RELATED APPLICATIONS

This application claims the benefit of the European patent application No. 12382410.4 filed on Oct. 22, 2012, the entire disclosures of which are incorporated herein by way of reference.

BACKGROUND OF THE INVENTION

The present invention relates to an aircraft digital audio system and, in particular, to a digital audio system comprising more than one audio equipment and more than one radio equipment.

In known aircraft audio systems, an operator, using a headset that transmits an audio message hears his own voice in the headset with a time delay less than approximately 20 ms from issuing the message, so that the radio that transmits the message to the outside sends back an "echo-message", commonly known as side tone.

The reception of the side tone in the operator headset fulfills two functions: not confusing him (letting him hear his own voice as happens when not using the headset) and confirming that the audio message is being properly transmitted to the outside by the radio.

If the radio is not transmitting, the side tone is not sent back and its absence allows the operator to be informed of it.

Aircraft audio systems using local side tones to reduce the time spent by pilots to establish a radio communication are also known.

In known aircraft digital audio systems that manage more than one piece of audio equipment and more than one piece of radio equipment and have latencies greater than 20 ms in the sum of forward and return paths, the distribution of side tone from the radio does not allow the operator to speak without confusion because he hears his own voice delayed.

The present invention is directed to solving this problem.

SUMMARY OF THE INVENTION

It is an object of the present invention to provide an aircraft digital audio system working with audio transmission latencies greater than 20 ms that allows the operators to receive quality and reliable side tone audios.

This object is achieved by a system comprising one or more pieces of audio equipment and one or more pieces of radio equipment. Each piece of radio equipment comprises transmitting/receiving means for analog audio messages and has installed in the proximity a terminal of the digital audio system (hereinafter radio-terminal) connected to a digital network which includes a digital messages management unit and a digital signal processor. Each piece of audio equipment includes a microphone, an activator of a discrete signal for emitting analog audio messages and headset for receiving analog audio messages and has installed in the proximity a terminal of the digital audio system (hereinafter audio-terminal) which includes a digital message management unit, with a computer program adapted to generate a side tone of an analog audio message issued by the microphone and to activate/deactivate its sending to the headset when the audio-terminal receives from the radio-terminal an activation/deactivation command for said side tone, and a digital signal processor.

Advantageously, in digital audio systems with latencies greater than 20 ms the activation/deactivation command of the side tone is received at the audio-terminal, in a time less than 120 ms with respect to the time of generation of the analog audio message. On the other side, upon receipt of an activation command, the side tone is received by the headset in a time less than 20 ms along the duration time of the transmission. Then, in the case of a successful transmission, the objective is achieved that the operator hears his own voice in a time delay less than 20 ms, being irrelevant in this respect the loss of side tone for the part of the audio message elapsed during the waiting time for the activation command (less than 120 ms).

Advantageously the side tone is generated with the volume set in the reception potentiometer of the radio equipment.

In one embodiment, the digital signal processor of the radio-terminal includes a computer program for transmitting said command of activation/deactivation to the audio-terminal when the power level of the audio signal in the reception line of the radio equipment surpasses/not surpasses a pre-set level. It is therefore the result of the monitoring of the return signal of the radio equipment which determines the issuance of said command.

In one embodiment, the digital signal processor of the radio-terminal includes a computer program for transmitting the deactivation command to the audio-terminal when there is no audio signal in the transmission line of the radio equipment. The transmission line is, thus, monitored to detect errors within the digital audio system itself.

In other embodiments are contemplated adaptations of the digital audio system for special configurations such as:
 Two operators transmitting by the same radio simultaneously.
 Radio synchronization tones.
 PA (Passenger Address) Ringtone.
 Simultaneous transmissions.

Other desirable features and advantages of the digital audio system according to the invention will become apparent from the subsequent detailed description of the invention and the appended claims, in relation with the enclosed figures.

DETAILED DESCRIPTION OF THE PREFERRED EMBODIMENTS

Figure 1A:
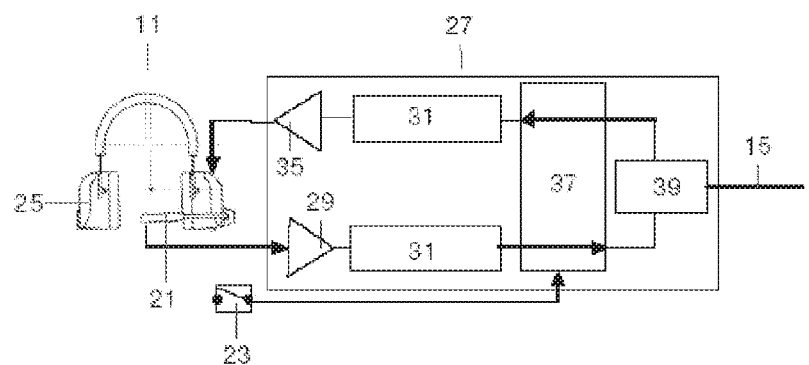
FIGS. 1a and 1b are schematic diagrams showing the major components of a digital audio system known in the art. A piece of audio equipment, a piece of radio equipment and audio and radio terminals installed next to them which are connected to a digital network are shown.
Figure 1B:
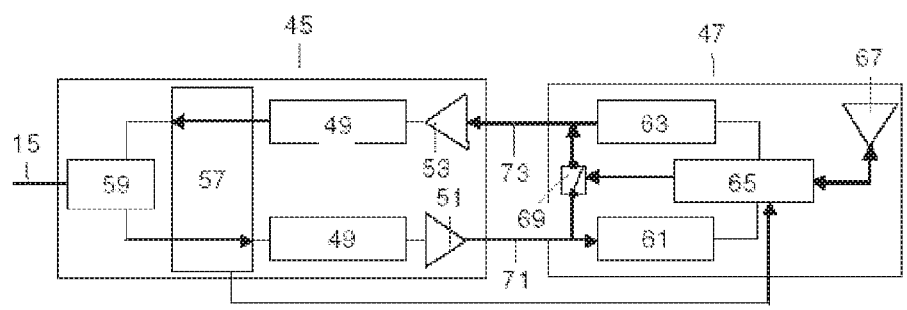

As shown in FIGS. 1a and 1b, a known digital audio system of an aircraft comprises, on the one hand, one or more pieces of audio equipment 11 with an audio-terminal 27 installed in the proximity of each piece of audio equipment and, on the other hand, one or more pieces of radio equipment 47 with a radio-terminal 45 installed in the proximity of each piece of radio equipment 47. The audio-terminal 27 and the radio-terminal 45 are connected to a digital network 15 where both the audio messages and the data messages to control the system are transmitted.

A piece of audio equipment 11 comprises the devices handled by an aircraft operator, i.e., a microphone 21, an actuator 23 of a PTT ("Push To Talk") discrete signal relative to the emission of a message and a headset 25.

An audio-terminal 27 comprises several components to perform the tasks involved in managing digital messages.

These components include:

Adjusting units 29, 35 for carrying out an amplification and impedance adaptation to the analog audio signal coming from the microphone 21 and to the analog audio signal sent to the headset 25.

Converters A/D D/A 31 to carry out the transformation of the analog signal emitted by the microphone 21 to a digital signal and the transformation of a digital signal sent to the headset 25 to an analog signal.

A digital messages management unit 37, which may be a FPGA (Field-Programmable Gate Array) that, in addition to group in packages of a configurable size the digital frames resulting from the A/D conversion of the audio signal corresponding to a message emitted by the microphone 21, performs message management tasks to the signals sent by the actuator 23 or to the commands received from the digital signal processor 39.

A digital signal processor 39 which performs processes of digital signals and commands the network interfaces to check and send digital audio messages to the data network 15.

A piece of radio equipment 47 comprises means for transmitting/receiving analog audio messages.

A radio-terminal 45 comprises several components to perform the tasks involved in managing digital messages. These components, similar to those of the audio-terminal 27 of the audio equipment 11, include a digital signal processor 59, a digital messages management unit 57, adjusting units 53, 51 for carrying out an amplification and impedance adaptation to the analog audio signal coming from the transmitting/receiving means of the radio equipment 47 and to the analog audio signal coming from the microphone 21 and converters A/D D/A 49 to carry out the transformation of the analog audio signal coming from the transmitting/receiving means of the radio equipment 47 to a digital signal and the transformation of a digital signal coming from the microphone 21 to an analog signal.

The digital audio signal corresponding to an audio message emitted by the microphone 21 is received in the digital signal processor 59 of the radio-terminal 45 and sent to the digital messages management unit 57 which manages the mixing of this signal with other signals received by other channels as well as the activation of the PTT transmission discrete signal from the commands received from the digital signal processor 59. After the conversion to an analog signal in the D/A converter 49 and the amplification and impedance adaptation in the adjusting unit 51, the message reaches the transmitting/reception means of the radio equipment 47 from where it is transmitted to its destination.

On the other hand, the return analog signal from the radio equipment 47, after the amplification and impedance adaptation in the adjustment unit 53, is converted to a digital signal in the A/D converter 49 and arrives at the digital messages management unit 57 and at the digital signal processor 59 which sends the converted digital signal to the digital network 15.

The analog messages transmitting/receiving means of the radio equipment 47 comprises a transmitter 61, a control unit 65, a receiver 63, an antenna 67 and a switch 69 and are arranged so that the switch 69 allows adding the signal of the transmission line 71 to the receiving line 73 when the transmission of the audio message is successful. The corresponding audio message reaches the headset 25 of the operator of the audio equipment confirming the transmission of the message. Thus, a side tone of the message being transmitted is sent by the receiving line 73 when the transmission is successful. If the transmission fails, the switch 69 is closed and the side tone does not appear in the receiving line 73, its absence being a warning for the operator of the audio equipment 11.

The latency times in digital audio systems such as that described may be such that do not allow operating with the radio equipment 47 because the side tone cannot be received in the receiving line 73 with a low enough delay. This imposes a restriction on the latency of the signal in the audio system of less than 10 ms per path that can be difficult to implement in digital audio systems comprising several pieces of transmission equipment and several communication services as happens in the digital audio system of certain aircraft.

To solve this problem, the present invention proposes to generate the side tone in the audio-terminal 27 next to the audio equipment 11 and send the side tone to the headset 25 when the audio-terminal 27 receives, from the radio-terminal 45 next to the radio equipment 47 to which the message is sent, a command confirming the successful transmission of the audio message. The side tone shall be heard on the headset 25 with the volume corresponding to the reception potentiometer of the radio equipment 47. Thus, the principle that the side tone corresponds to a radio return message, whose volume is controlled by the potentiometer of that radio, is maintained.

Thus, according to the present invention, the generation of the local side tone is based on the detection of the side tone on the radio equipment 47. If a successful transmission by the radio equipment occurs, the generation of a local side tone and its sending to the headset 25 of the operator with a good audio quality is activated without requiring any complex signal processing requiring processor load as discussed below. In case of an unsuccessful transmission by the radio equipment, the side tone is not sent advising the operator of a transmission problem.

Figure 2:
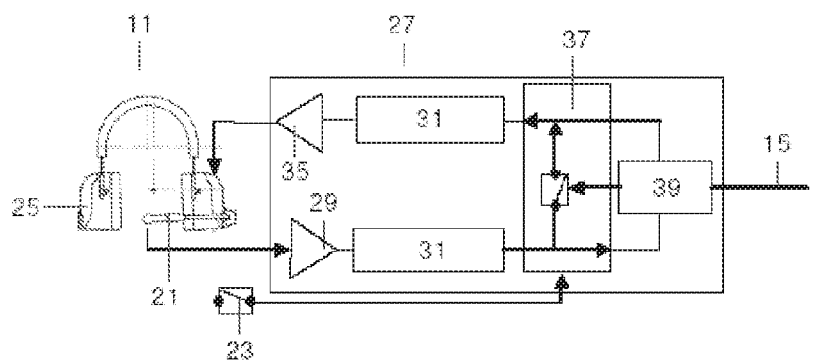
FIG. 2 is a schematic diagram of a piece of audio equipment and of the audio-terminal installed next to it belonging to a digital audio system according to the invention.

To this end, in a digital audio system according to the invention comprising the audio equipment 11 and the audio-terminal 27 represented in FIG. 2 and the radio-terminal 45 and the radio equipment 47 shown in FIG. 1b, the digital messages management unit 37 of the audio-terminal 27 includes a computer program to send the side tone to headset 25, the digital messages management unit 57 of the radio-terminal 45 includes a computer program to detect if the audio message has been transmitted or not transmitted by transmission/reception means of the radio equipment 47 and the digital signal processors 39, 59 of the audio-terminal 27 and the radio-terminal 45 include computer programs to send a command to the digital messages management unit 37 to activate sending the side tone to headset 25 in the event of a successful transmission and to deactivate it otherwise.

Figure 3:
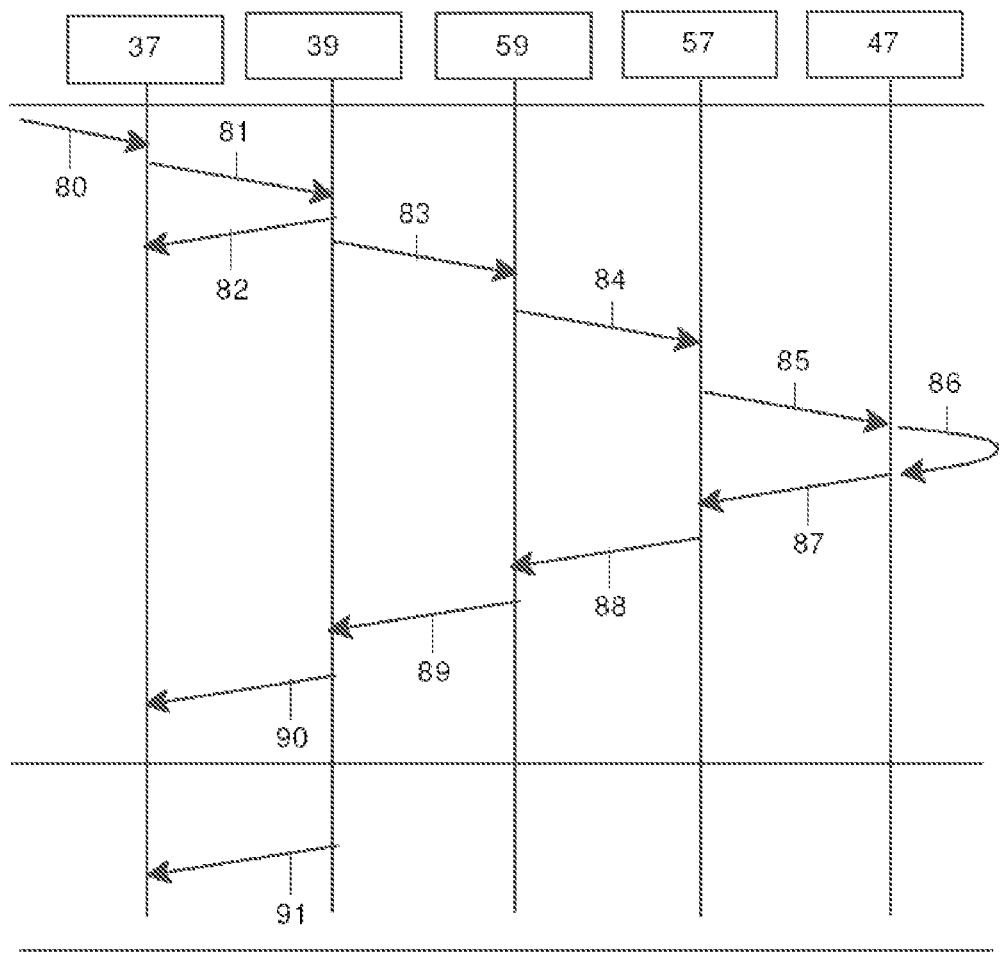
FIG. 3 is a schematic diagram illustrating the generation and transmission of side tone in a digital audio system according to the invention.
Figure 3:
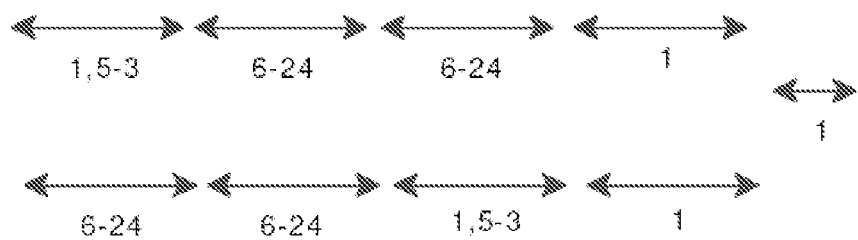

The initialization sequence of the activation command follows the following scheme (see FIG. 3).

Step 80 indicates the actuation of the actuator 23 of the PTT discrete signal by the operator of audio equipment 11 which reaches the digital messages management unit 37 of the audio-terminal 27 and triggers the detection mechanism of side tone on the radio-terminal 45.

In step 81 the digital messages management unit 37 sends to the digital signal processor 39 of the audio-terminal 27 the audio message emitted by the microphone 21 in a digital frame format, indicating in the frame header that is the audio message from the audio equipment 11 corresponding to the PTT discrete signal sent by the actuator 23.

In step 82, the digital signal processor 39 sends a command to the digital messages management unit 37 to deactivate the side tone that is provided in this unit.

In step 83, the digital signal processor 39 of the audio-terminal 27 sends the audio message to the digital signal processor 59 of the radio-terminal 45 by the digital network 15 with a header that includes data of the source audio equipment 11 and of the destination radio equipment 15.

In step 84, the digital signal processor 59 sends the audio message to the digital messages management unit 57 of the radio-terminal 45 which, in step 85, sends it to the transmission/reception means of the radio equipment 47 after its conversion to an analog signal in the D/A converter 49.

If the transmission/reception means of the radio equipment 47 successfully perform the transmission, the radio side tone is generated in step 86 by means of the switching device 69 controlled by the control unit 65.

In step 87 the radio side tone is sent to the digital messages management unit 57 and, then, in step 88, to the digital signal processor 59 of the radio-terminal 45 where a measurement of the level of the received audio signal is performed.

In step 89, the digital signal processor 59 sends the audio digital frames received to the digital signal processor 39 of the corresponding audio-terminal 27 through the digital network 15 with a header indicating the source radio equipment 45 and the destination audio equipment 11, if the level of the received signal exceeds a preset threshold.

In step 90, the digital signal processor 39 sends a command for activating the side tone to the digital messages management unit 37 of the audio-terminal 27, after checking that the source/destination identification data of said frames match those of the frames sent at step 83. The reception of this command activates, as mentioned above, sending the side tone to the headset 25 of the audio equipment 11. Said activation does not take place if said command is not received.

In the bottom of FIG. 3 are shown the time intervals (in ms) involved in the steps for sending the side tone to the headset of the audio equipment involving a maximum of about 120 ms which is sufficiently low for the audio equipment operator does not perceive an initial cut in the beginning of the conversation.

The digital signal processor 59 of the radio-terminal 45 also monitors the level of the audio signal at the receiving line 71 while the mentioned PTT discrete signal is activated. If, in that case, the level of audio signal on the receiving line 71 is lost, the digital signal processor 59 of the radio-terminal 45 would deactivate the transmission of the audio frames mentioned in step 89. In the absence of said audio frames, the digital signal processor 39 of the audio-terminal 27 sends, in step 91, a command to the digital messages management unit 37 to deactivate the sending of the side tone to the headset 25 of the audio equipment 11, preventing its reception by the operator.

Since in the present invention the side tone is not provided by the radio equipment 45 but collected from the microphone 21 of the audio equipment 11, the digital audio system must be ready to accommodate it in those situations wherein the audio provided in the reception line 73 of the radio equipment 45 is different from that transmitted from the microphone 21. Some of those situations and the corresponding adaptation in the audio system are the following.

Two operators transmitting simultaneously by the same radio. If the digital audio system allows for two audio pieces of equipment to transmit simultaneously through the same radio equipment, the digital audio system must be adapted so that the local side tone collected from the microphone of one audio equipment arrives at the other audio equipment when the corresponding message is being transmitted successfully by the radio equipment.

Radio equipment with HF radios. When HF radios are tuned to a frequency, they require an initial time not available for transmission. During this time the radio sends a notice to the operator by the reception radio channel radio advising that the transmission is not available. The notice is sent as a tone pattern. The use of local side tone requires that digital audio system has the capability to detect this tone pattern and transmit this audio signal to the operator.

Radio equipment with VUHF/HF radios. The "cryptos" of VUHF/HF radios provide at the start of a transmission a tone warning that the transmission is not possible for a given time. If the duration time of the tone is constant, the use of local side tone requires that the digital audio system has a timer that allows the operator to hear this tone for the set time.

PA (Passenger Address) Ringtone. The aircraft PA system provides at the start of the transmission a tone alerting call initiation. If the duration of the tone is constant, the use of local side tone requires that the digital audio system has a timer that allows the operator to hear this tone for the set time.

Simultaneous transmissions. For those digital audio systems whose performances permit a simultaneous transmission by different radios, each of them provides a side tone. The use of a local side tone requires determining what radio is monitored to detect a radio side tone and what volume is applied to this side tone. One possible solution is that the side tone be monitored in the radio having the reception potentiometer of a higher volume and that the volume of the side tone corresponds to the position of this potentiometer. Another possible solution is to provide the detection of the radio side tone and its volume sequentially from the first to the last selected radio in a simulcast configuration.

Although the present invention has been described in connection with various embodiments, it will be appreciated from the specification that various combinations of elements, variations or improvements therein may be made, and are within the scope of the invention.

The invention claimed is:

1. A digital audio system of an aircraft comprising:
   one or more pieces of audio equipment,
   one or more pieces of radio equipment,
   an audio-terminal and a radio-terminal installed, respectively, in a proximity of the pieces of audio and radio equipment,
   the audio equipment, the radio equipment and the audio-terminal and radio-terminal being connected to a digital communications network,
   each piece of audio equipment comprising a microphone, a headset for receiving analog audio messages and an actuator of a discrete signal for emitting analog audio messages,
   each piece of radio equipment comprising transmission/reception means for an analog audio message including a transmitter, a receiver with a reception potentiometer, a control unit and a switch for controlling a signal addition from the transmitting line to the receiving line,
   each audio-terminal comprising adjustment and conversion means of digital messages in analog messages and of analog messages in digital messages, a digital messages management unit and a digital signal processor,
   each radio-terminal comprising adjustment and conversion means of analog messages into digital messages and of digital messages into analog messages, a digital messages management unit and a digital signal processor, wherein the digital messages management unit of each radio-terminal includes a computer program adapted to generate a side tone of an analog audio message emitted by the microphone and to activate/deactivate its sending to the headset when the radio-terminal in the proximity of the radio equipment to which said audio analog message is sent detects a successful transmission and generates a command of activation/deactivation of said side tone depending on the transmission/non-transmission of the analog audio message by the radio equipment.

2. A digital audio system according to claim 1, wherein:
audio transmission latencies of the system are greater than 20 ms, and
the command for activating/deactivating said side tone is received in the audio-terminal in a time less than 120 ms with respect to a time of generation of the analog audio message.

3. A digital audio system according to claim 2, wherein, after the reception of a side tone activation command, the side tone is received in said headset in a time less than 20 ms with respect to the time of generation of the analog audio message.

4. A digital audio system according to claim 2, wherein said side tone is generated with a volume set in the reception potentiometer of the radio equipment.

5. A digital audio system according to claim 1 wherein the digital signal processor of the radio-terminal includes a computer program adapted for transmitting said command of activation/deactivation to the audio-terminal when a power level of the return audio signal in a receiving line of the radio equipment surpasses/does not surpass a pre-established threshold.

6. A digital audio system according to claim 1, wherein the digital signal processor of the radio-terminal also includes a computer program adapted to transmit a deactivation command of the side tone to the audio-terminal when there is no audio signal in a transmission line of the radio equipment.

7. A digital audio system according to claim 1, comprising at least two pieces of audio equipment and one piece of radio equipment, wherein the system components are arranged to send the message to the headsets as the side tone corresponding to an audio message delivered by one of the pieces of audio equipment when the message is successfully transmitted by the radio equipment.

8. A digital audio system according to claim 1, wherein a computer program included in a management unit of the audio-terminal is adapted so that the side tone also includes the initial audio generated prior to the emission of a message.

9. A digital audio system according to claim 8, wherein said initial audio is audio generated during a synchronization time of the radio equipment.

10. A digital audio system according to claim 8, wherein said initial audio is audio generated during a ring time.

11. A digital audio system according to claim 1, comprising at least one piece of audio equipment and at least two pieces of radio equipment, wherein the system components are arranged for a simultaneous emission of the messages emitted by the audio equipment and wherein the activation/deactivation command of the side tone is sent from the radio-terminal installed in the proximity of one of the pieces of radio equipment which is selected according to a pre-established criterion.

12. A digital audio system according to claim 11, wherein said activation/deactivation command is sent from the radio-terminal installed in the proximity of the radio equipment having the reception potentiometer set at a relatively highest volume.

* * * * *